United States Patent [19]

Kawamura

[11] Patent Number: 5,577,014
[45] Date of Patent: Nov. 19, 1996

[54] DISK CARTRIDGE OPPOSITE-INSERTION PREVENTING MECHANISM

[75] Inventor: Shigeo Kawamura, Tokyo, Japan

[73] Assignee: NKK Corporation, Tokyo, Japan

[21] Appl. No.: 378,674

[22] Filed: Jan. 26, 1995

[30] Foreign Application Priority Data

Jan. 27, 1994 [JP] Japan .................................. 6-007784

[51] Int. Cl.⁶ .................................................. G11B 33/02
[52] U.S. Cl. ........................................ 369/77.2; 360/99.06
[58] Field of Search ............................. 369/77.2, 77.1, 369/75.2; 360/99.02, 99.06, 99.03, 99.07

[56] References Cited

U.S. PATENT DOCUMENTS

| | | | |
|---|---|---|---|
| 5,046,170 | 9/1991 | Oshima et al. | 360/99.02 |
| 5,164,935 | 11/1992 | Shimegi et al. | 369/77.2 |
| 5,224,079 | 6/1993 | Inoue | 369/77.2 |
| 5,297,133 | 3/1994 | Otsuka et al. | 360/133 |

FOREIGN PATENT DOCUMENTS

| | | | |
|---|---|---|---|
| 63-9072 | 1/1988 | Japan | 360/99.02 |

*Primary Examiner*—Stuart S. Levy
*Assistant Examiner*—William R. Korzuch
*Attorney, Agent, or Firm*—Michael N. Meller

[57] ABSTRACT

A disk cartridge opposite-insertion preventing mechanism has levers 11 pivoted on shafts 12 in opposite sides of a carrying tray 10 into which a disk cartridge 1 is inserted. Torsion springs 13 are provided for urging the levers to project into the carrying tray; and projections 14 are formed at respective forward ends of the levers so as to be bent inward to permit the projections 14 to engage with terraced grooves 2 provided in opposite sides of a forward end portion of the disk cartridge 1. In this manner the insertion of the disk cartridge is prevented by the engagement between the projections and the grooves when the disk cartridge is inserted in a direction opposite to normal.

4 Claims, 4 Drawing Sheets

DISK CARTRIDGE OPPOSITE-INSERTION PREVENTING MECHANISM

BACKGROUND OF THE INVENTION (a) Field of the Invention

The present invention relates to a disk cartridge opposite insertion preventing mechanism for correctly limiting the direction of insertion of a disk cartridge containing an optical disk or the like into an apparatus or casing body of a disk cartridge.

(b) Description of the Prior Art

A conventional disk cartridge containing an optical disk has such a structure as shown in FIGS. 4 and 5. That is, terraced grooves 2 for positioning the disk cartridge 1 are provided on opposite sides of the forward end portion 6 of the disk cartridge 1; notch portions 3 used for carrying the disk cartridge 1 are provided on opposite sides of the rear end portion of the disk cartridge 1; and light-transmission windows 4 for detecting light are provided near the notch portions 3, respectively.

When, for example, the disk cartridge 1 is inserted into a carrying tray used in an automatic disk exchanger or the like, the light-transmission windows 4 or notch portions 3 of the disk cartridge 1 are detected by transmission type or reflection type sensors to thereby judge whether the direction of insertion of the disk cartridge 1 is normal or not. It is therefore necessary to provide sensors for detecting the light-transmission windows 4 or notch portions and attendant electric circuits therewith.

SUMMARY OF THE INVENTION

Because the conventional disk cartridge opposite-insertion preventing mechanism requires sensors and attendant electric circuits therewith as described above, there arise problems upon increase of apparatus cost, lowering of reliability caused by the maloperation of the sensors, and so on.

The present invention is attained in order to solve the aforementioned problems and an object of the present invention is to provide a disk cartridge opposite-insertion preventing mechanism which can limit the direction of insertion of a disk cartridge mechanically without necessity of use of any electric circuit.

The present invention is designed so that a disk cartridge is mechanically prevented from being inserted reversely by using terraced grooves provided in opposite sides of an end portion of the disk cartridge. That is, according to an aspect of the present invention, a disk cartridge opposite-insertion preventing mechanism provided in an apparatus or casing body into which a disk cartridge having at least one terraced groove in a side surface at its forward end portion is inserted, the disk cartridge opposite-insertion mechanism comprises: at least one lever pivoted on one side of the apparatus or casing body; a spring for urging the lever to project to the inside of the apparatus or casing body; and a projection portion provided at forward end of the lever so as to be engageable with the terraced groove of the disk cartridge.

Preferably, the projection portion is formed by laterally bending the forward end portion of the lever.

Preferably, the lever is provided on each of the opposite sides of the apparatus or casing body respectively so that the levers in pair are pivotally arranged in left and right openings, respectively, formed in the bottom surface of the apparatus or casing body and so that the pair of levers can stand up and fall down freely.

Because the disk cartridge opposite-insertion preventing mechanism according to the present invention is configured as described above, the projections at respective ends of the levers engage with the terraced grooves provided in opposite sides of an end portion of the disk cartridge so that the projections cannot get rid of the grooves when the disk cartridge is reversely inserted into the apparatus or casing body. Accordingly, the disk cartridge is prevented from being further inserted. If the direction of insertion of the disk cartridge is normal, the projections are merely pushed by the rear end surface of the disk cartridge so that there is nothing but rotation of the levers. As a result, the levers fall down, so that the disk cartridge can pass by the levers. Accordingly, the disk cartridge can be inserted into the apparatus or casing body so as to reach a predetermined position of the apparatus or casing body.

As described above, the present invention is designed so that the direction of insertion of the disk cartridge is mechanically limited by using terraced grooves provided in opposite sides of an end portion of the disk cartridge and by providing levers having projections capable of engaging with the grooves in the apparatus or casing body. Accordingly, the apparatus is simplified in structure, so that there arises an effect that the simplification of the apparatus greatly contributes to reduction in cost. Further, the mechanism operated securely without any risk of trouble because the mechanism is operated entirely mechanically. Accordingly, there arises an effect that an improvement in reliability is attained.

DESCRIPTION OF THE PREFERRED EMBODIMENTS

Figure 1:
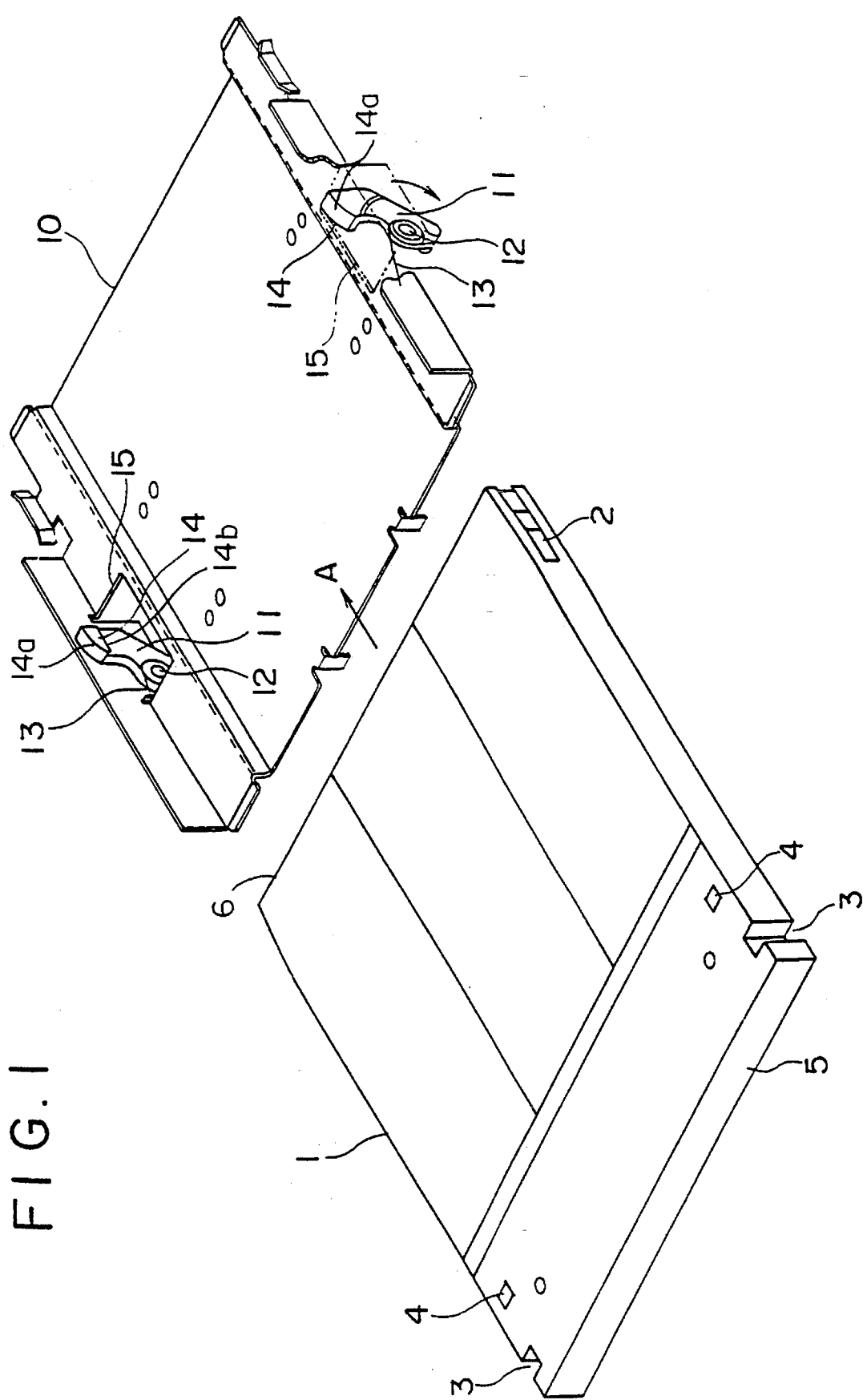
FIG. 1 is a perspective view showing an embodiment of the present invention.

FIG. 1 is a perspective view of a disk cartridge opposite-insertion preventing mechanism according to an embodiment of the present invention showing the case where the preventing mechanism is provided in a carrying tray 10. Assume now that the disk cartridge 1 is inserted into the carrying tray 10 in the direction of the arrow A.

The carrying tray 10 is substantially U-shaped in section. A pair of levers 11 are provided so as to be pivoted on shafts 12, respectively in middle portions in the direction A on the opposite sides of the carrying tray 10. The levers 11 are formed by plastic molding, press molding, or the like. The shafts 12 are provided with torsion springs 13, respectively, so that the torsion springs 13 urge the levers 11 to erect to the inside of the carrying tray 10. The respective forward end portions of the levers 11 are bent laterally toward the center of the carrying tray 10 to form projections 14, respectively. Each projection portion of lever 14 has a curved upper surface 14a and a rectilinear lower surface 14b substantially parallel to the groove 2 of the disk cartridge 1. The pair of levers 11 are pivotally arranged in left and right openings 15, respectively, provided in the bottom surface of the carrying tray 10. The pair of levers 11 project into the inside of the carrying tray 10 through the openings 15, respectively.

The operation of the preventing mechanism in the case where the disk cartridge 1 is inserted reversely as shown in FIG. 1 will be described below. Assume now that the direction of insertion of the disk cartridge 1 is reverse when the forward end portion of the disk cartridge 1 is inserted into the carrying tray 10 in the direction of the arrow A.

Figure 2A:
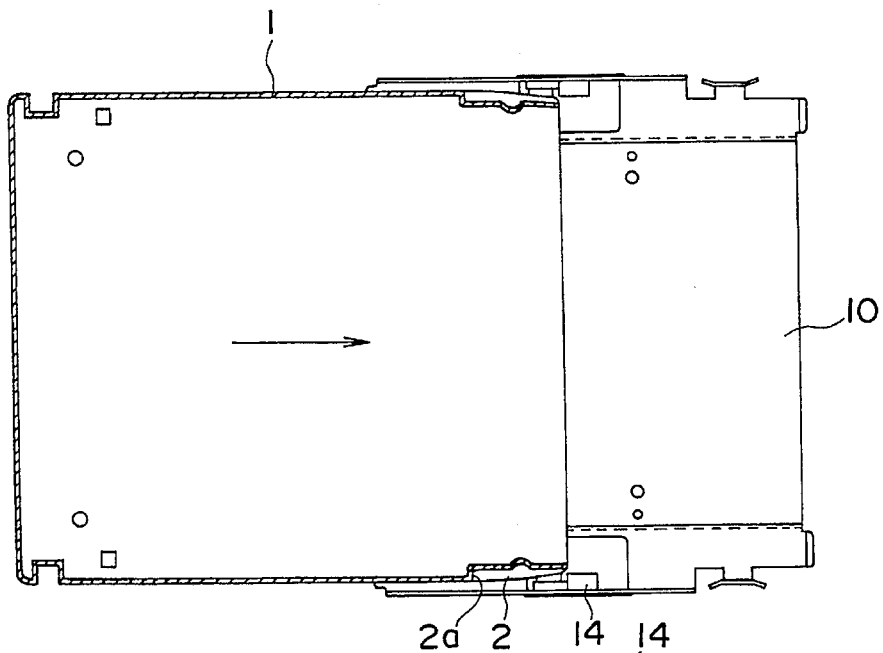
FIGS. 2A, 2B, 2C and 2D are views for explaining the operation of the mechanism in the case where a disk cartridge is inserted reversely.
Figure 2B:
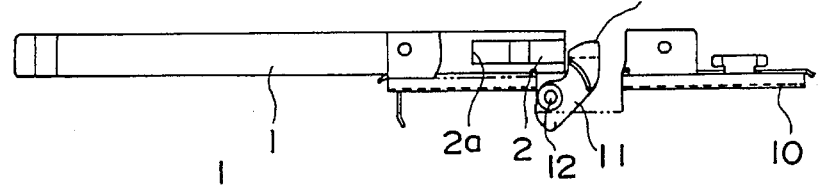
Figure 2C:
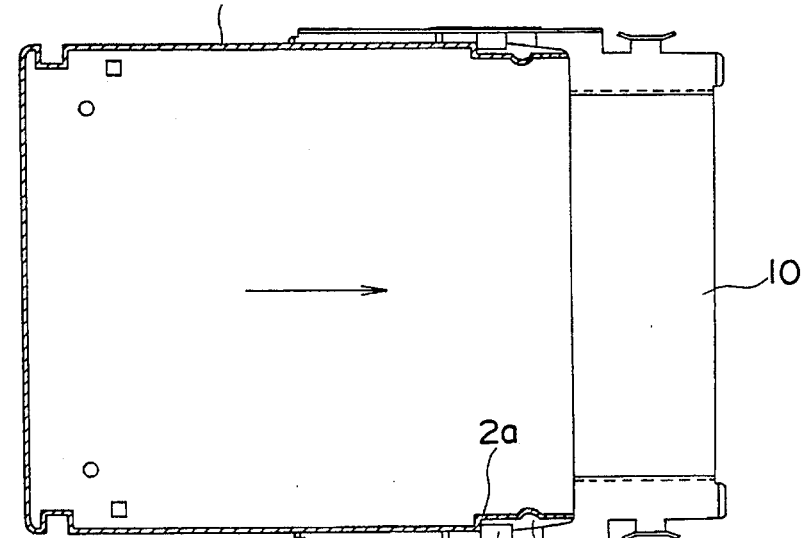
Figure 2D:
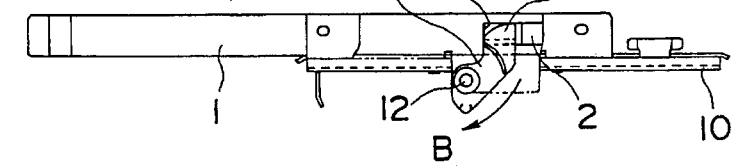

FIGS. 2A, 2B, 2C and 2D are views for explaining the operation of the mechanism at the time of reverse insertion. FIG. 2A is a plane view of the mechanism before the projections 14 of the levers 11 engage with the grooves 2 of the disk cartridge 1 respectively; FIG. 2B is a side view of the mechanism at the same point of time; FIG. 2C is a plane view of the mechanism after the projections 14 of the levers 11 engage with the grooves 2 respectively; and FIG. 2D is a side view of the mechanism at the same point of time.

The disk cartridge 1 has the terraced grooves 2 on the opposite sides of its forward end portion as described above. Assuming now that the disk cartridge 1 is inserted reversely as shown in FIG. 1, then the projections 14 of the levers 11 enter the grooves 2 respectively. When the disk cartridge 1 is further inserted, the projections 14 are pushed by the respective terrace portions 2a which are rear portions of the grooves 2 as shown in FIGS. 2C and 2D, so that the levers 11 are urged to rotate around the shafts 12 in the direction of the arrow B. The disk cartridge 1, however, cannot be inserted any more because the difference in level in the grooves 2 prevents the projections 14 from getting rid of the grooves 2. That is, because the projections 14 engage with the grooves 2 at the forward end portion of the disk cartridge 1 so that the levers 11 serve as stoppers, not only the reverse insertion of the disk cartridge 1 can be detected by this mechanism but also the reverse insertion of the disk cartridge 1 can be prevented by this mechanism.

Figure 3A:
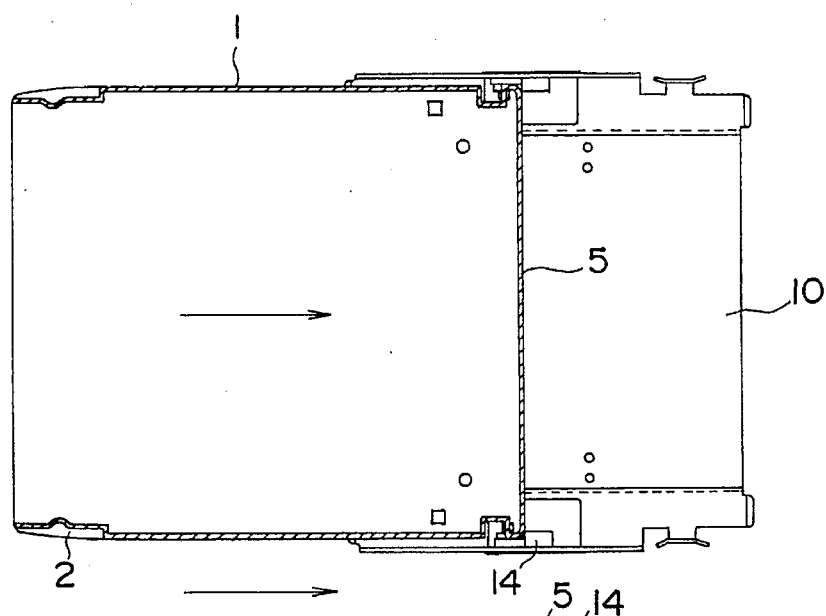
FIGS. 3A, 3B, 3C, 3D and 3E are views for explaining the operation of the mechanism in the case where the disk cartridge inserted normally.
Figure 3B:
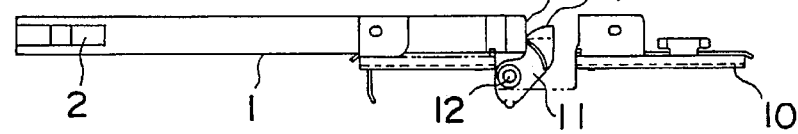
Figure 3C:
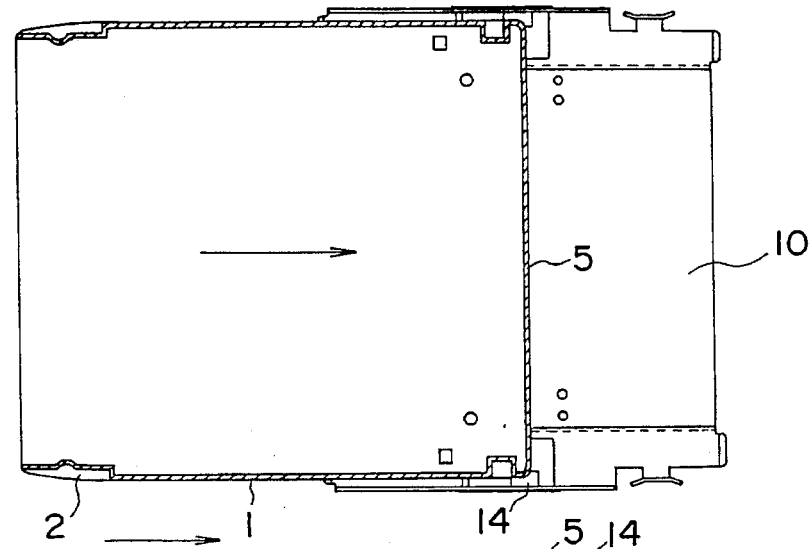
Figure 3D:
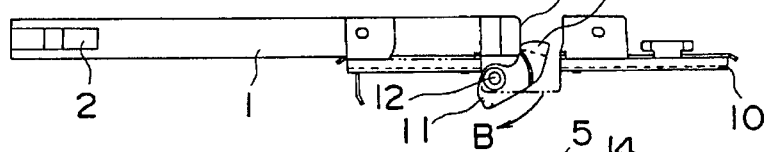
Figure 3E:
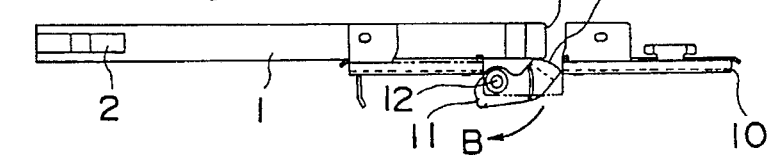
Figure 4:
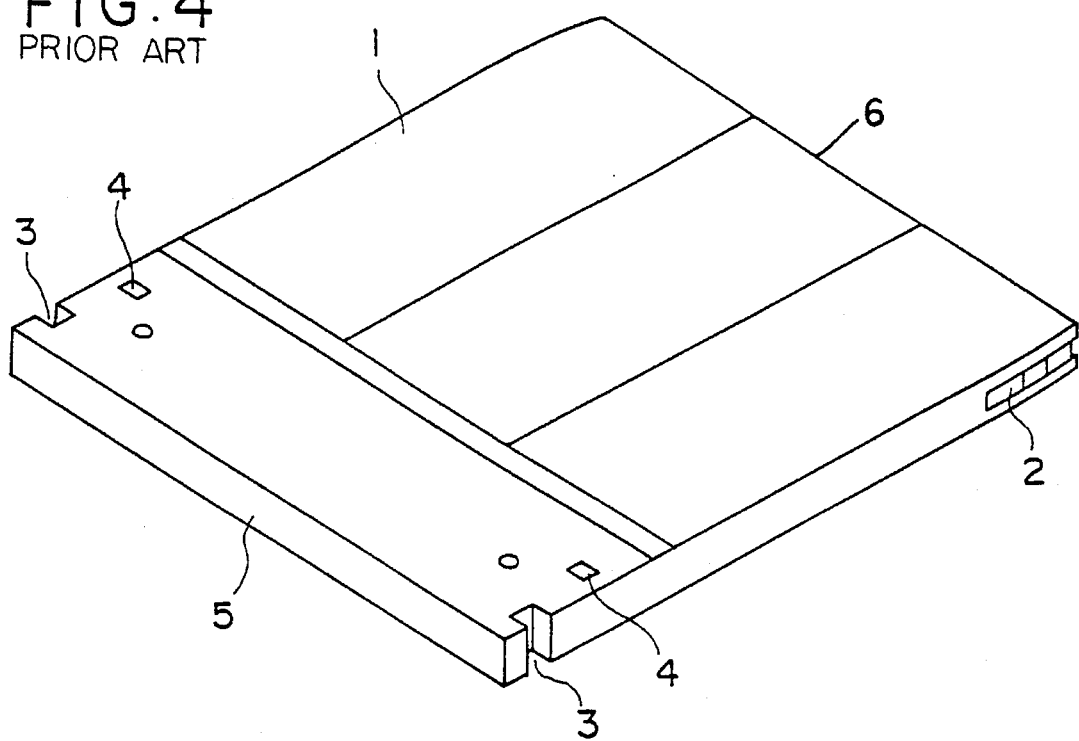
FIG. 4 is a perspective view of the disk cartridge.
Figure 5:
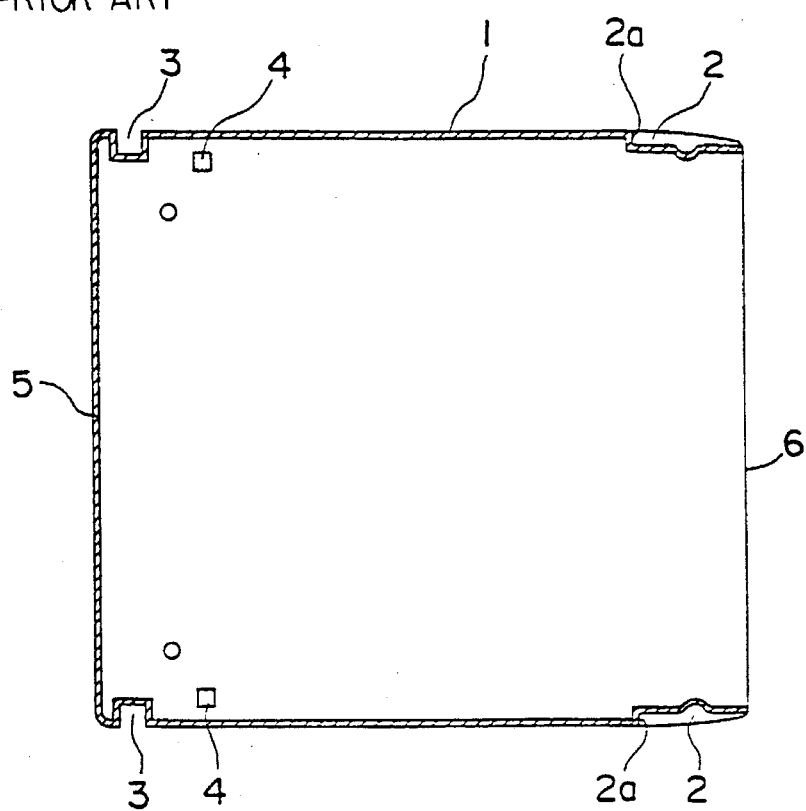
FIG. 5 is a sectional plane view of the disk cartridge.

The operation of the mechanism in the case where the disk cartridge 1 is inserted normally will be described below with reference to FIGS. 3A, 3B, 3C, 3D and 3E. FIG. 3A is a plane view of the mechanism when the rear end surface 5 of the disk cartridge 1 is in contact with the projections 14 of the levers 11; FIG. 3B is a side view of the mechanism at the same point of time; FIG. 3C is a plane view of the mechanism when the disk cartridge 1 is further inserted; and FIGS. 3D and 3E are side views of the levers 11 at the same point of time.

The direction of insertion of the disk cartridge 1 is normal when the rear end surface 5 of the disk cartridge 1 is inserted into the carrying tray 10 in the direction of the arrow A. For example, in an automatic disk exchanger, grasp claws of a carrier go in/out from a side reverse to the direction of insertion so that the grasp claws can engage with the notch portions 3 in the one side portion of the disk cartridge 1.

When the disk cartridge 1 is inserted normally as shown in FIGS. 3A and 3B, the rear end surface 5 of the disk cartridge 1 comes into contact with the end portions of the projections 14 of the levers 11. When the disk cartridge 1 is further inserted, the projections 14 are pushed by the rear end surface 5 respectively so that the levers 11 are urged to rotate in the direction of the arrow B as shown in FIG. 3D. Because there is no barrier in the direction of rotation of the levers 11, the levers 11 can rotate freely. Accordingly, the levers 11 fall down as shown in FIG. 3E, so that the disk cartridge 1 can pass over the levers 11. Accordingly, the disk cartridge 1 can be inserted into the carrying tray 10 so as to reach a predetermined position of the carrying tray 10.

Although the aforementioned embodiment has shown the case where a pair of levers 11 are provided on the left and right sides of the carrying tray with respect to the direction of insetion of the disk cartridge, a sufficient function or effect can be achieved even in the case where either one of the two levers is provided. In addition, this preventing mechanism can be applied not only to the carrying tray but also to a general casing body so long as the direction of insertion of the disk cartridge 1 can be limited.

I claim:

1. A disk cartridge opposite-insertion preventing mechanism provided in an apparatus adapted to receive a disk cartridge, said disk cartridge having front, rear and side surfaces, said rear surface being flat and facing said mechanism for correct disk cartridge insertion, at least one of said side surfaces being formed with at least one groove extending in said side surface from a front edge of said front surface to a terrace portion which forms a rear end portion of said groove, said mechanism comprising at least one lever pivotally mounted on said apparatus, said lever having a projection portion provided at one end thereof; and a spring mounted on said apparatus for urging said projection portion of said lever into said groove when said disk cartridge is inserted incorrectly, whereby said projection portion of said lever contacts said rear end portion of said groove to prevent further insertion of said disk cartridge into said apparatus and whereby said rear surface of said cartridge contacts said lever and rotates said lever against said spring during correct disk cartridge insertion so that said lever does not prevent insertion of said disk cartridge.

2. A disk cartridge opposite-insertion preventing mechanism according to claim 1, wherein said projection portion of said lever comprises a curved upper surface and a rectilinear lower surface substantially parallel to said groove so that for correct disk cartridge insertion said projection portion permits said disk cartridge to be smoothly inserted into said apparatus by first contacting said flat rear surface and then an upper or a lower surface of said disk cartridge.

3. A disk cartridge opposite-insertion preventing mechanism according to claim 2, wherein said projection portion and said lever are molded in a single integral structure.

4. A disk cartridge opposite insertion preventing mechanism according to claim 1, wherein said apparatus has a surface with an opening formed therein and said lever is mounted so that said lever may pivot in said opening.

* * * * *